March 31, 1925.

A. L. GALUSHA

GAS PRODUCER

Filed Nov. 11, 1922

Inventor
Albert L. Galusha
Attorney Parker W. Page

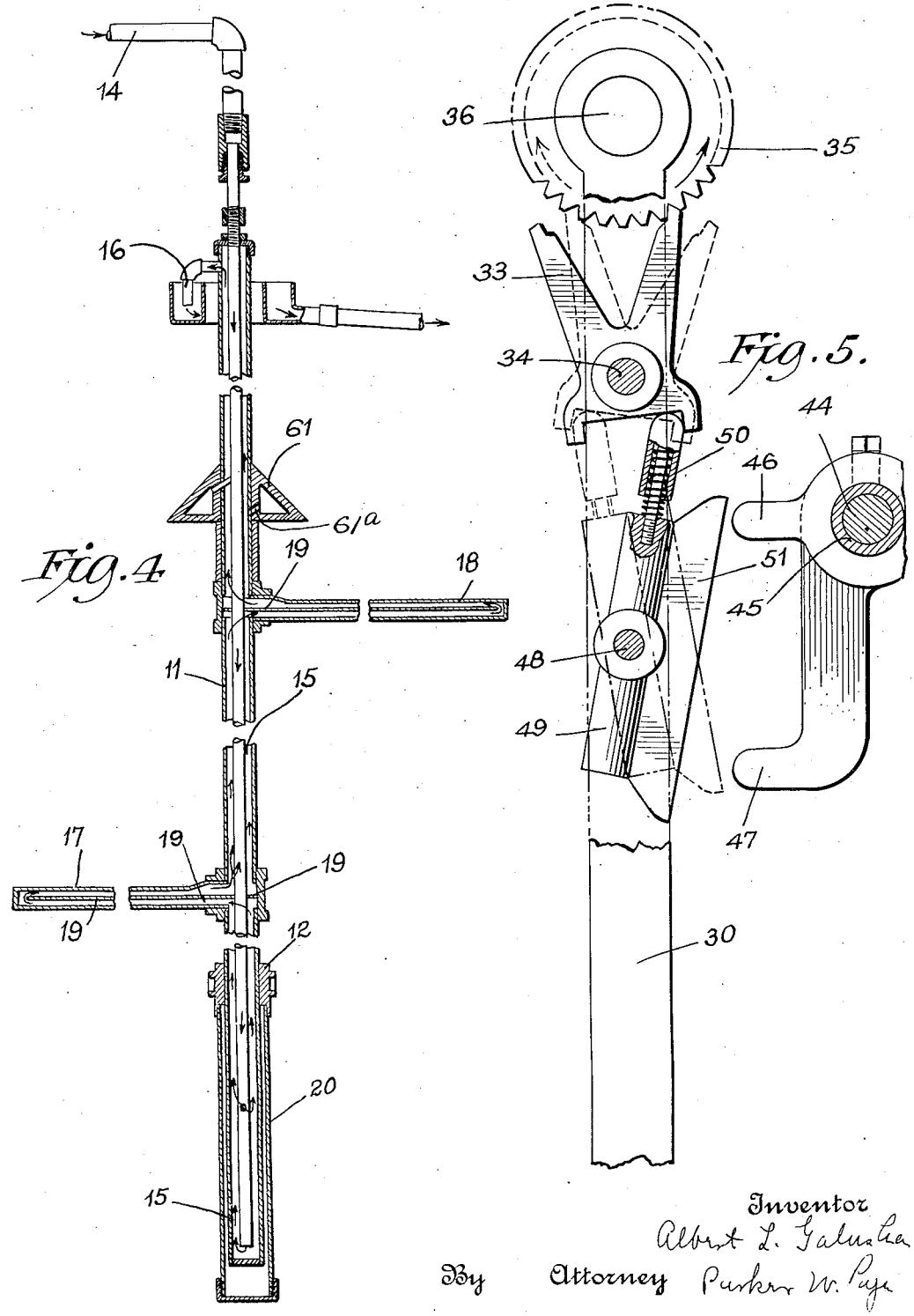

Patented Mar. 31, 1925.

1,531,857

UNITED STATES PATENT OFFICE.

ALBERT L. GALUSHA, OF CALDWELL, NEW JERSEY.

GAS PRODUCER.

Application filed November 11, 1922. Serial No. 600,234.

*To all whom it may concern:*

Be it known that I, ALBERT L. GALUSHA, a citizen of the United States of America, residing at Caldwell, in the county of Essex, and State of New Jersey, have invented certain new and useful Improvements in Gas Producers, of which the following is a full, clear, and exact description.

In an application filed by me on May 27, 1922, Serial No. 564,092 which has now matured into Patent No. 1,506,826, I have shown and described a gas producer which was devised and designed with the special object of meeting certain fundamental requirements for successful and economical operation in devices of this character. For a better understanding of the nature and purpose of the invention upon which is based this application for Letters Patent, and which is an improvement on the device of the application referred to, these requirements may be briefly stated.

Primarily for considerations of economy of operation the device should be, as far as practicable and possible, automatic in its action. In addition to this a continuous feed of the fuel at the same rate as that at which it is being gasified; an uninterrupted stirring, breaking up and compacting of the fuel bed; a leveling off of both top and bottom of the fuel bed; a removal of the ash continuously at the rate at which it is produced and a breaking up and stirring of the ash and clinkers are all requirements, particularly in the case of fuel having a large volatile content, which demand the most careful consideration if the best conditions for economical operations are to be secured.

For these reasons and as a result of practical experience it is most desirable to stir up, break up and level off substantially every cubic inch of the fuel bed as well as of the ash so as to secure in all parts of the same at all times a uniform draft and this involves a uniform depth of fuel and of the ash.

No gas producers of which I have knowledge are free from certain objections which may well be rated as defects and which may be enumerated as follows. The absence of means for leveling off both top and bottom of the ash. The absence of means by which the entire body of the fuel bed may be properly and uniformly stirred. The absence of means for leveling off both top and bottom of the fuel bed. The absence of adequate means free from complication for accomplishing the above results, even approximately, including the proper removal of the ash. The absence of any automatic means for distributing the fuel uniformly over the entire fuel bed.

In addition to the above, gas producers as heretofore made have no adequate means for compensating for wear in the fuel feed or for taking care of expansion and contraction to avoid leakage or preventing sticking or stoppage of the apparatus and in the case of those producers which employ vertical agitators or stirring arms, the tendency to develop vertical holes through the fire has resulted in air coming up from the ash-pit to the top of the bed which burns the gas and impairs the efficiency of the apparatus.

I have devised my present form of gas producer to overcome these objections and in this effort I have had a signal success. The chief feature of novelty resides in a single stirring arm which is so arranged as to travel in a spiral path up and down through the entire fuel and ash bed thereby agitating most effectively and with no attendant inconvenience practically the whole space within the same. In addition to this I have devised certain other novel features the nature of which will be most readily understood from the specification which follows:

In the drawings hereto annexed,

Fig. 4 is a vertical central sectional view on an enlarged scale of the shaft passing through the fire chamber.

Fig. 5 is an enlarged detail view in plan with parts in part section of the means for securing the movement of the fuel stirring arm above referred to.

Fig. 6 is a side view of portions of the motion transmitting device.

Much of the apparatus herein shown is now of a known character and requires but a passing description. Such parts comprise a closed fire chamber lined with refractory material 2, a grate with the usual beam 3 supported at its ends and near its center by a column 4, a foundation 5, a fuel feed device 6 and other accessory parts which will be hereinafter more particularly referred to.

Figure 3:
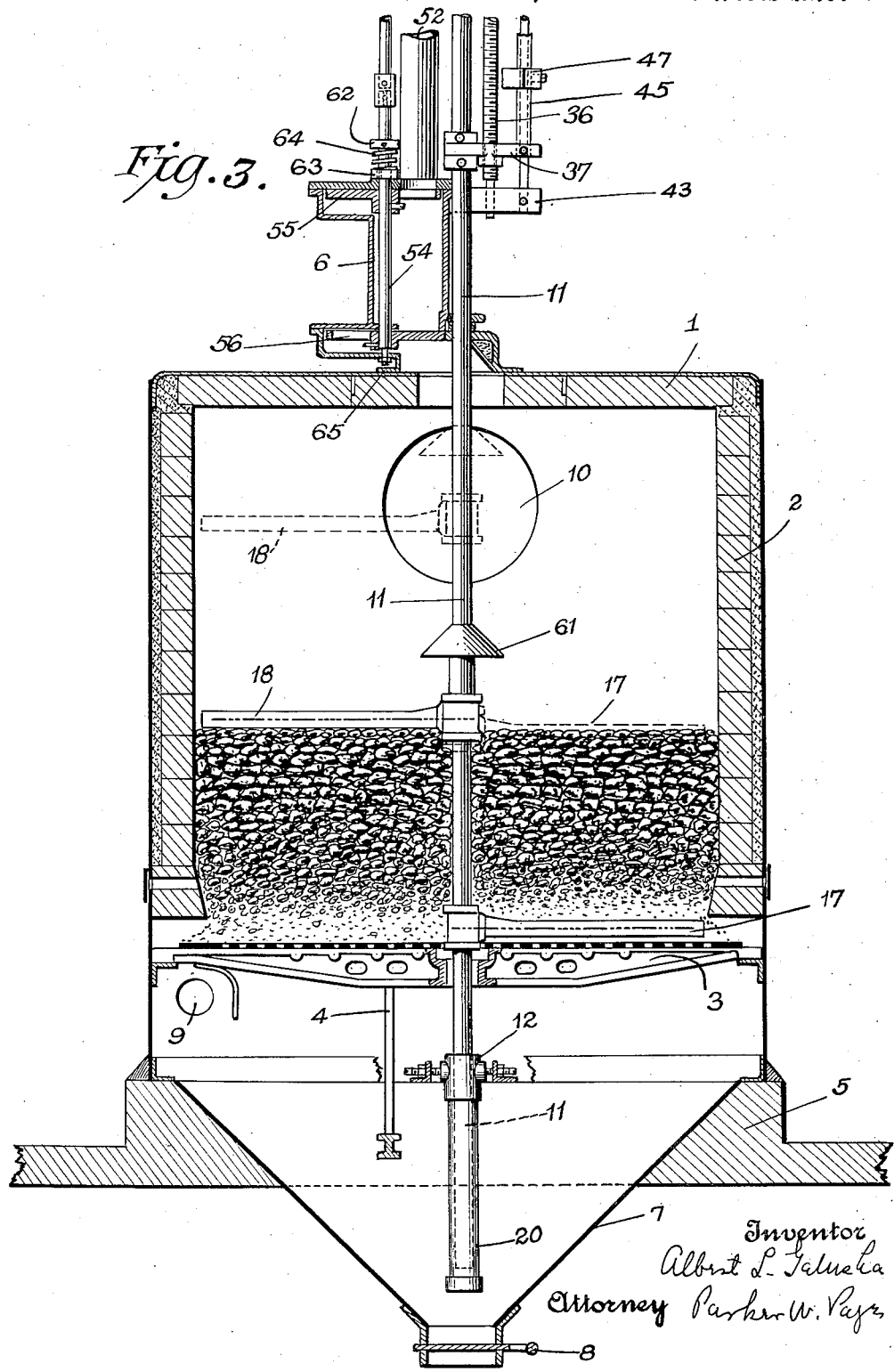
Fig. 3 is a central vertical section of the fire chamber and the operative parts contained therein.

Beneath this fire chamber the top of which is 1 in Fig. 3, is a conical ash-pit 7 with an outlet at the apex controlled by a sliding door 8. The ash-pit is provided with the usual means 9 for admitting a regulable amount of moist air while the fire chamber has an outlet 10 for carrying off the generated gas.

Centrally located in the device is a water cooled tubular shaft 11. In the ash-pit this shaft has a bearing 12 through which it has free vertical movement and above the fire chamber the shaft has a similar and suitable bearing. A water pipe 14 admits water to the tubular shaft and this water passes through the whole length of the shaft issuing into the outer water jacket 15 through which it rises to the outlet 16.

Rigidly secured to the shaft or water jacket 15 is a tubular arm 17 which serves as a horizontal stirrer and at a suitable distance above this arm more or less equal to the normal depth of the fuel bed is or may be a second arm 18 of similar character. The tubular shaft 11 is surrounded at the junctions with the jacket 15 of the arms 17 and 18 with an interior partition or dividing wall 19 which extends out through the said arms and causes the water rising within the hollow shaft 11 to flow to the ends of said arms and back to the jacket thus cooling not only the shaft but both of the horizontal arms. Below the bearing 12 there is a tubular protecting casing 20 which surrounds the hollow shaft and prevents the ash from coming in contact therewith.

The arm 17 is designed to rotate slowly about the center of the tube 11 and at each revolution to rise or fall through a space about equal to its vertical thickness which may be two or three inches, more or less. To accomplish this I employ the following mechanism.

Figure 2:
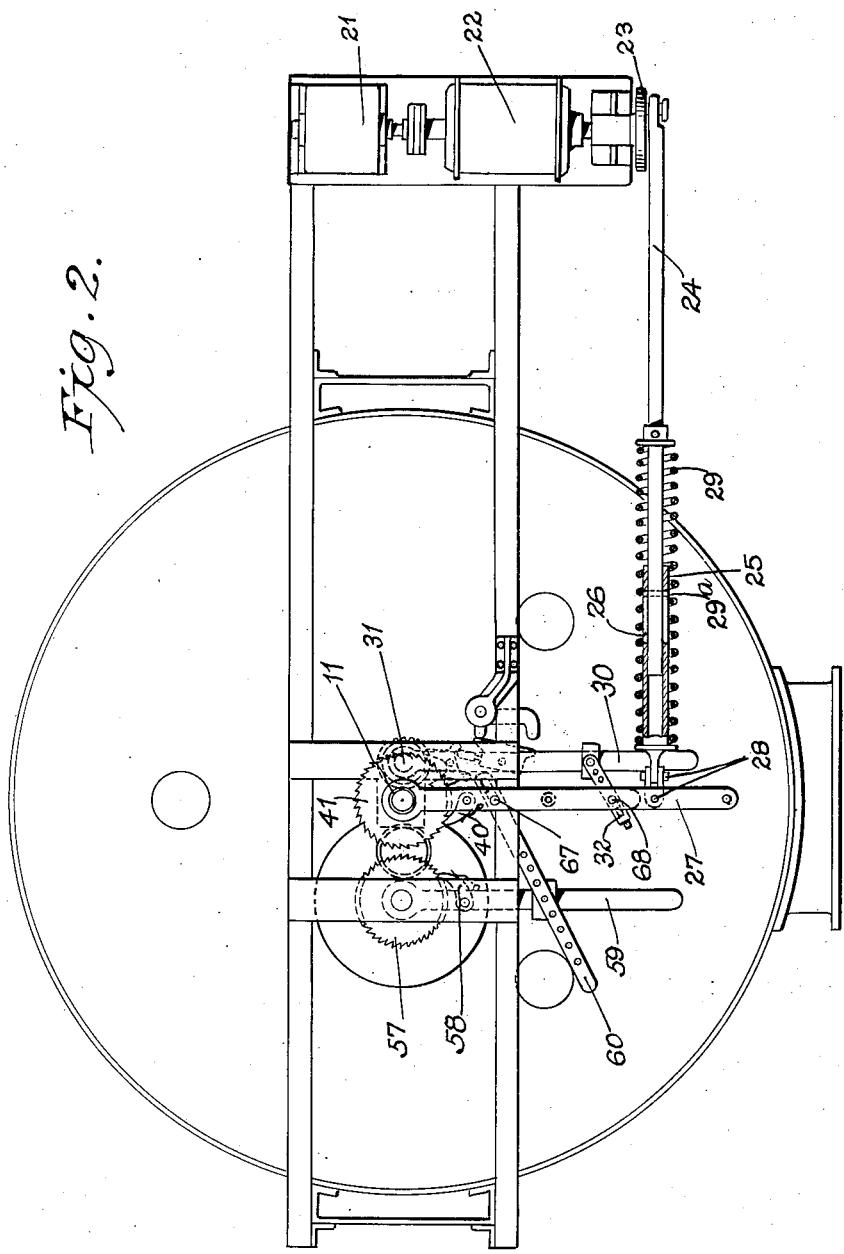
Fig. 2 is a top plan view of the same parts.

Suitably mounted on a stationary support in the vicinity of the shaft 11 Fig. 2, is a motor 21. Connected therewith is a speed reducer 22 driving a disk crank 23, to which is pinned a connecting rod or bar 24 which by the rotation of the motor and the said disk is slowly oscillated. The rod 24 enters a tube 25 and engages therewith by a pin 29ª which it carries that enters a slot 26 in said tube. The end of the latter is pivotally connected with a pair of connected levers 27, pivoted at 28, and a spiral spring 29 between collars at the end of the tube and fixed to the rod 24 maintains the compound bar comprising the rod 24 and tube 25 at its maximum length but permits the rod 24 to oscillate should anything occur to arrest the movement of the levers 27.

Figure 1:
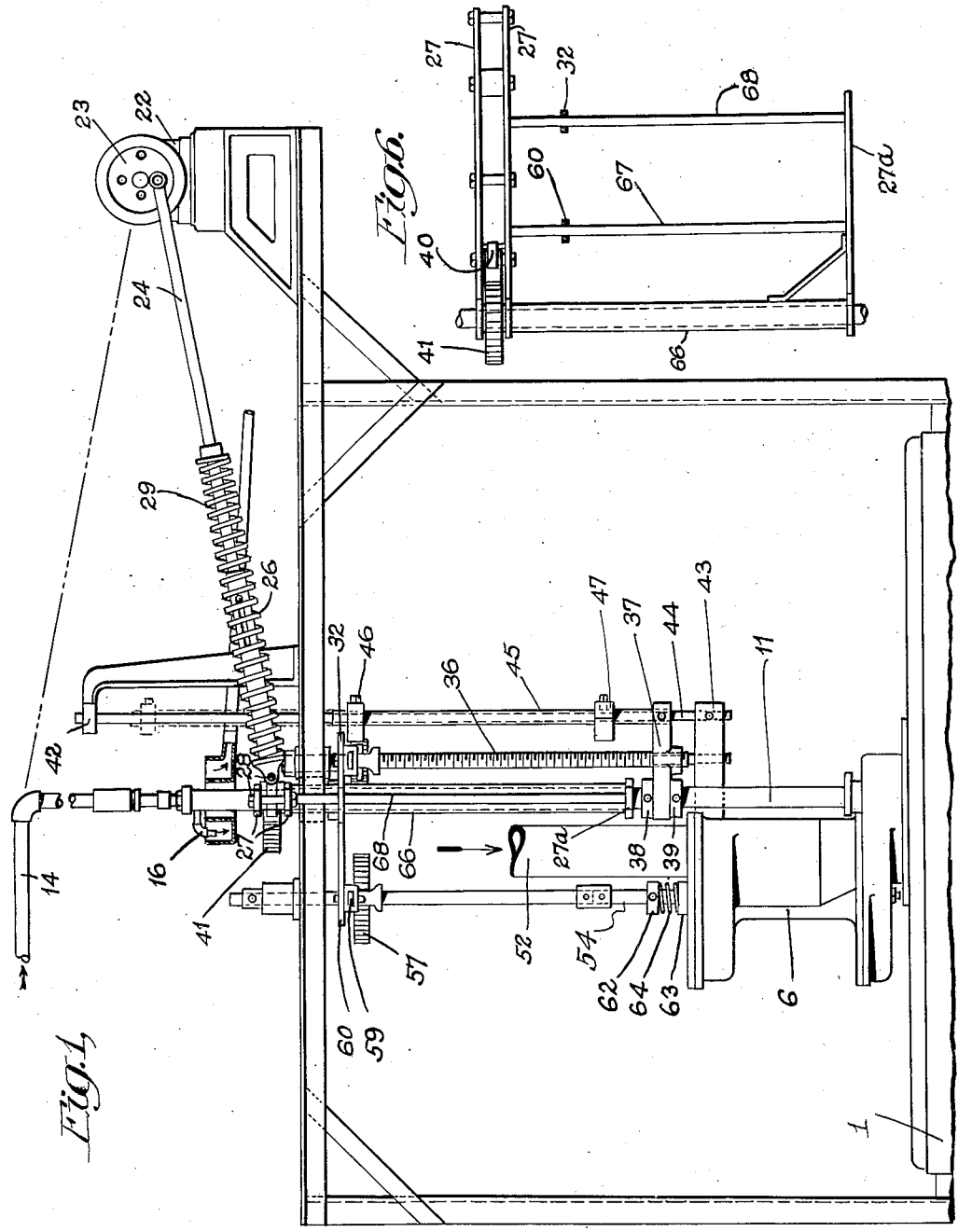
Fig. 1 is a view in elevation of the operative parts of the producer which surmount the furnace or fire chamber.

A lever or arm 30 pivoted at 31 is connected by a link 32 to the levers 27. Any suitable and known provision is made for adjusting the throw of said link for the purpose of regulating or contributing to the regulation of the arc through which the arm 30 oscillates in obedience to the oscillation of the levers 27. It will be understood that the levers 27 are connected with the hollow shaft 11 and rise and fall with the said hollow shaft. For this purpose a sleeve 66 surrounds the shaft and the lower one of the levers 27 is secured to this sleeve. In order that the link 32 may be oscillated, rods 67 and 68, Figs. 1 and 6, connect the levers 27 with a third lever 27ª also connected with the sleeve 66, and one of these rods 68 passes through the link 32 so that the said link is oscillated in all positions of the shaft 11. Pivoted to the arm 30 at 34 (see Fig. 5) is a double pawl or dog 33 which is adapted to engage the teeth of a ratchet wheel 35 on a rotary vertical spindle 36 in fixed bearings. This rod 36 is screw-threaded throughout its entire length and passes through and engages by its threads with a bar or casting 37 embracing loosely the water jacketed or cooled tube 11 between two fixed collars 38 and 39 thereon.

The levers 27, pivoted to oscillate concentrically with the tube 11, by being secured to a sleeve 66 surrounding said tube, carry a pivoted spring actuated pawl 40 Fig. 2 which engages with the teeth of a ratchet wheel 41 keyed to the water cooled tube 11 from which it follows that the oscillations of the arms or levers 27 slowly turn or rotate the tube 11.

While this tube is thus rotated it is also slowly raised or lowered by the bar or casting 37 in threaded engagement with the rotating screw spindle 36 and whether it be moved upward or downward depends upon the position of the double pawl 33 Fig. 5 with reference to the ratchet wheel 35. This is determined by the following mechanism.

In stationary supports 42 and 43 a rod 44 is secured which is parallel with the screw spindle 36. Around this rod is a sleeve 45 secured to the bar or casting 37 and carrying two adjustable stops 46 and 47. As the tube 11 rises or falls this sleeve with its stops partakes of its movement keeping pace with it. On the lever 30 is pivoted at 48 a casting 49 having a spring actuated head 50 that engages with the rear or lower side of the double pawl 33.

The casting 49 has an elongated straight edge flange 51, one edge of which normally projects into the path of the stops 46 and 47 as the arm or lever 30 is oscillated. Assume, therefore, that the pawl 33 is in the position shown in Fig. 5 and that it is held in this position by the action of spring head 50. As the lever 30 oscillates the ratchet wheel 35 will be turned in the direction indicated by the arrow. Assume further that this lowers the sleeve 45 until the stop 46 is brought down into alignment with the upper edge of the flange 51, then on the next movement of oscillation of the lever 30 the casting 49 will be turned on its pivot with the result that the double pawl is shifted to bring the other point of the same into engagement with the teeth of ratchet 35. Further oscillation of the arm 30 will therefore turn the screw spindle 36 in the opposite direction and raise the sleeve 45 until stop 47 comes to the position where it throws the pawl again and reverses the direction of rotation of the spindle 36.

The limits of the vertical movement of the stirrer arm 17 are thus dependent upon the adjusted position of the stops 46 and 47. It may be caused to approach more or less closely the grate bars in the ash as conditions of operation may require, and its upward movement may be similarly determined and controlled.

I now refer to such minor features of construction as are not obvious to one skilled in this art from a mere inspection of the drawings. The fuel is delivered to the producer through a pipe or chute 52, Fig. 3. This pipe enters a hopper 6, through which extends a vertical spindle 54 carrying two disks 55 and 56. These disks contain openings at diametrically opposite portions of the two disks and if the spindle is rotated the opening in the upper disk registers with the opening to which the pipe 52 is connected. This permits the casing to be filled with fuel. On a further rotation of the spindle this opening is closed and a discharge outlet on the bottom of the casing is opened by the lower disk 56. The fuel is thus dropped into the fire chamber.

The spindle 54, Fig. 3, is rotated by a ratchet wheel 57, Fig. 2, which is turned by a pawl 58 carried by an arm or lever 59 oscillated by a link 60 through which passes the rod 67, connecting the levers 27 with a third lever 27ª secured to the sleeve 66.

In order that the fuel may be evenly and properly distributed I secure to the vertically movably water jacket 11 a conical deflector 61, preferably water cooled, by a passage 61ª leading from the water jacket 11. The fuel entering the fire box falls upon this shield or deflector. It then glances off in a line nearly parallel to the inclined face of the cone, and the nearer the latter is to the top of the chamber the wider will be the distribution of the fuel. As the shaft descends the radius of distribution will become less and less so that in the end the charge of fuel will be evenly distributed over the entire top of the bed.

The fuel feed device is peculiarly liable to disturbance of operation by reason of undue expansion and contraction. To obviate any difficulty in this regard I secure a collar 62 to the shaft 54 and key another collar 63 to the same and place a spiral spring 64 between the two. By this means the disks are kept tight against their seats while an adjustable stop 65 prevents them from dropping away too far from their seats.

I have shown and described a second arm 18, Fig. 3, as attached to the vertically movable shaft 11 and the purpose of this arm is to rake over, break up and smooth the top of the fuel bed at the time when the other arm 17 is in its lowermost position in the ash. This is a useful, but not an indispensable element in the device and may be omitted if so desired.

Having now described my invention, what I claim as new is:

1. In a gas producer, the combination with the fire box containing the fuel bed and a grate at the bottom of the same, of a central vertical rotatable shaft extending through the fire box and through a bearing below the grate, a horizontal stirring arm secured to the shaft, and means for raising and lowering the shaft and thereby moving the stirring arm through substantially all parts of the fuel bed from immediately over the grate to the top of said bed.

2. In a gas producer, the combination with the fire box containing the fuel bed and a grate at the bottom of the same, of a vertically movable rotary shaft extending centrally through the fire box and through a bearing below the grate, a horizontal stirring arm secured to the said shaft, and means for raising and lowering the shaft and thereby moving the stirring arm in a spiral path from immediately over the grate to the top of the fuel bed.

3. In a gas producer, the combination with the fire box containing the fuel bed and a grate at the bottom of the same, a vertically movable rotary shaft passing centrally through the fire box, an ash stirrer secured to said shaft and capable of movement in a spiral path from immediately over the grate through the fuel bed, a dry ash pit beneath the grate and a slide controlled outlet at the bottom of the ash-pit.

4. In a gas producer, the combination with the fire box containing the fuel bed, and a grate at the bottom of the same, of a horizontal vertically movable stirring arm capable of rotation about a central axis and extending through a bearing below the grate and means for moving the same in a spiral path up or down between the top of the fuel bed and a point immediately over the grate.

5. The combination with the fire box and grate of a gas producer containing the fuel bed, of a dry ash-pit, a slide controlled outlet on the ash-pit, and means for agitating substantially all parts of the fuel bed and ash from the top of said bed down to the grate in order to maintain an even draft over the outer area of the ash-pit.

6. The combination with the fire box of a gas producer containing the fuel bed, of a central fuel supply inlet at the top and a distributing shield in the form of an inverted cone vertically movable from near the inlet to near the fuel bed upon which the fuel falls as it enters the fire box.

7. The combination with the fire box of a gas producer containing the fuel bed, of a fuel supply inlet at the top and a conical water cooled shield or distributor movable vertically under said inlet from near the same to near the fuel bed.

8. The combination with the fire box of a gas producer containing the fuel bed, of a rotary and at the same time vertically movable shaft passing centrally through the same, and horizontal arms carried by said shaft, the lower one of which is capable of being carried by the vertical movement of the shaft through substantially all parts of the fuel bed, and the upper being in such relation to the lower as to level off the top of the bed when in its lowermost position.

9. The combination with the fire box of a gas producer containing the fuel bed, of a rotary vertical shaft passing centrally through the same, a horizontal stirrer arm carried by said shaft, means for moving the shaft while in rotation vertically sufficiently to carry the said arm through substantially all parts of the fuel bed and means for reversing such vertical movement at any desired point.

10. The combination with the fire box of a gas producer containing the fuel bed, of a rotary shaft passing vertically through the same, a horizontal stirrer carried by said shaft, means for imparting rotation to the shaft, means for simultaneously raising or lowering the said shaft, comprising a double pawl and ratchet and stops movable with the shaft for throwing the pawl and reversing the movement at the desired points in the vertical travel of the shaft.

11. The combination with the fire box of a gas producer containing the fuel bed, of a shaft passing vertically through the same and carrying a horizontal stirring arm, means for raising and lowering the said shaft through the fuel bed and means for rotating the shaft comprising a ratchet wheel fixed to the shaft, a pawl engaging therewith and an oscillating lever movable up and down with the shaft on which the pawl is mounted.

12. The combination with the fire box of a gas producer, of a vertically movable rotary shaft carrying a stirring arm passing through the fuel bed in said fire box, means for rotating said shaft, and means for moving it vertically at the same time, said rotating means comprising an oscillating lever, a pawl carried thereby and a ratchet wheel on the shaft, all movable vertically with the shaft, and the said vertically moving means comprising a rotary screw shaft engaging with a part extending from the shaft and a ratchet wheel, an engaging pawl and an oscillating link connection with the vertically moving oscillating lever.

13. In a gas producer, the combination with the fire box containing the fuel bed, of a rotary shaft passing vertically and centrally through the fuel bed, an ash stirrer carried by said shaft, a dry ash-pit beneath the grate of the fire box, and a slide controlled outlet at the bottom of said ash pit.

In testimony whereof I hereto affix my signature.

ALBERT L. GALUSHA.